(12) United States Patent
Masuda et al.

(10) Patent No.: US 6,328,895 B1
(45) Date of Patent: Dec. 11, 2001

(54) CHROMATOGRAPHIC SEPARATION PROCESS

(75) Inventors: Takayuki Masuda; Kikuzo Kaneko; Kohei Sato; Fumihiko Matsuda, all of Tokyo (JP)

(73) Assignee: Organo Corporation, Tokyo (JP)

(*) Notice: Subject to any disclaimer, the term of this patent is extended or adjusted under 35 U.S.C. 154(b) by 0 days.

(21) Appl. No.: 09/463,688

(22) PCT Filed: May 27, 1999

(86) PCT No.: PCT/JP99/02796

§ 371 Date: Jan. 28, 2000

§ 102(e) Date: Jan. 28, 2000

(87) PCT Pub. No.: WO99/63339

PCT Pub. Date: Dec. 9, 1999

(30) Foreign Application Priority Data

May 29, 1998 (JP) .................................................. 10-150220

(51) Int. Cl.[7] .................................................. B01Q 15/08
(52) U.S. Cl. ........................................ 210/659; 210/198.2
(58) Field of Search ................................... 210/635, 656, 210/659, 198.2

(56) References Cited

U.S. PATENT DOCUMENTS

| | | | |
|---|---|---|---|
| 3,992,175 | * | 11/1976 | Klementi .................................. 55/67 |
| 5,064,539 | * | 11/1991 | Tanimura .............................. 210/659 |
| 5,198,120 | * | 3/1993 | Masuda ............................. 210/198.2 |
| 5,223,143 | * | 6/1993 | Masuda ................................ 210/659 |
| 5,391,299 | * | 2/1995 | Masuda ................................ 210/659 |
| 5,434,298 | * | 7/1995 | Negawa ............................... 210/659 |
| 5,470,464 | * | 11/1995 | Priegnits ............................. 210/659 |
| 5,498,752 | * | 3/1996 | Negawa ............................... 210/659 |
| 5,770,088 | * | 6/1998 | Ikeda .................................... 210/659 |

FOREIGN PATENT DOCUMENTS

| | | | |
|---|---|---|---|
| 51-107279 | 9/1976 | (JP) | ........................................ 210/659 |
| 4-227804 A | 8/1992 | (JP) | ........................................ 210/659 |
| 5-204 a | 1/1993 | (JP) | ........................................ 210/659 |
| 7-196705 A | 8/1995 | (JP) | ........................................ 210/659 |
| 9-132586 A | 5/1997 | (JP) | ........................................ 210/659 |

* cited by examiner

*Primary Examiner*—Ernest G. Therkorn
(74) *Attorney, Agent, or Firm*—Norris McLaughlin & Marcus (57) ABSTRACT

In separation of 3 components A, B and C having a C>B>A relation in respect of affinity for packing with a chromatographic separator comprising a circulation system formed by linking packing bed units 1 to 4 in endless series, the following Operations <2>→<4>→<1>→<4>→<3> are performed in Step (1) as Stage 1, and the following Operations <2>→<4>→<3> are repeatedly performed 3 times in subsequent Stages 2 to 4 in Step (2), provided that the fluid feed and withdrawal positions are respectively displaced one by one in the downstream direction of the circulation system every time after completion of each stage;

<1>: shutting off the circulation system, and withdrawing the whole of a component B fraction on the upstream side of the shutoff position while feeding a starting fluid material f to a packing bed unit on the downstream side of the shutoff position and feeding eluent D to the circulation system;

<2>: withdrawing part of a component A fraction while feeding eluent D to the circulation system;

<3>: withdrawing part of a component C fraction while feeding eluent D to the circulation system; and <4>: circulating the internal fluid through the system with neither fluid feed to nor fluid withdrawal from the circulation system.

11 Claims, 4 Drawing Sheets

Stage 2 [Step (2)] starting A withdrawal (withdrawal over 1/4 of stage)

capable of high-purity fraction A withdrawal

(b)

starting circulation (circulation over 1/2 of stage)

(c)

starting C withdrawal (withdrawal over 1/4 of stage)

capable of high-purity fraction C withdrawal (d)

Stage 3 [Step (2)] starting A withdrawal

at start of Stage 2

(b)

at start of Stage 3

CHROMATOGRAPHIC SEPARATION PROCESS

REFERENCE TO RELATED APPLICATIONS

This application is a 371 of PCT/JP99/02796 filed May 27, 1999.

TECHNICAL FIELD

The present invention relates to a process for chromatographic separation of components from a starting fluid material containing at least 3 components.

BACKGROUND ART

There are known various conventional methods of chromatographic separation of a starting fluid material containing, for example, 3 components classed as A, B and C into the respective components, representative examples of which include the following six methods:

A method (1) is a batchwise one called "preparatory chromatography," wherein analytical high-performance liquid chromatography is scaled up. However, this is not a method comprising a simulated moving bed operation.

A method (2) is one as disclosed in Japanese Patent Laid-Open No. 124,895/1990, wherein 2-component separation simulated moving bed equipment is used twice. More specifically, this is a method wherein a component A is first separated from a mixture of components B and C in a first step, and the recovered mixed components B and C are then separated from each other in a second step, provided that the partition coefficients of the 3 components are A<B<C for chromatographic packing. The component B having a medium partition coefficient may alternatively be separated together with the component A in the form of a mixture from the component in a first step instead of separation of the components B and C in the form of a mixture from the component A in the first step, followed by separation of the recovered mixed components A and B in a second step. In other words, 2 simulated moving bed chromatographic separators for separating 2 components are prepared or one such separator is used twice for separating 3 components because separation of only 2 components is possible with ordinary simulated moving bed equipment. Incidentally, various known types of separator(s) can be used as the 2-component separation simulated moving bed chromatographic separator(s) to be used in this method.

A method (3) is one disclosed in Japanese Patent Laid-Open No. 227,804/11992 (Japanese Patent Publication No. 24,724/1995). This is a method wherein at least 3 fractions of at least 3 components differing in affinity for packing (hereinafter often referred to simply as "affinity") are continuously separated from one another with one improved simulated moving bed chromatographic separator in a series of operations comprising repeating the step of withdrawing a component B having a medium affinity for packing while feeding desorbent such as eluent and a starting fluid material and the step of withdrawing a component A having a weak affinity for packing and a component C having a strong affinity for packing while feeding eluent.

A method (4) is one disclosed in Japanese Patent Laid-Open No. 10 158,105/1988. This is a method wherein use is made of a fixed bed chromatographic separator.

A method (5) is one disclosed in Japanese Patent Laid-Open No. 232,003/1995. This is a method wherein at least 3 fractions are separated by repeating the step of withdrawing a weak-affinity component A and a medium-affinity component B while feeding eluent and a starting fluid material to simulated moving bed equipment comprising 4 packing bed units, the step of circulating internal liquid through the simulated moving bed without liquid feed and withdrawal, and the step of withdrawing a strong-affinity component C while feeding eluent.

A method (6) is one disclosed in Japanese Patent Laid-Open No. 80,409/1989. In this method, use is made of an arrangement of a plurality of endlessly linked separation columns comprising separation columns packed with a first packing having the following partition coefficients for components: component A <component B <component C, and alternating with separation columns packed with a second packing having the following partition coefficients: component A <component C <component B.

The method (1) is poor in separation performance because it is batchwise, and hence is unfit for industrial-scale separation because a large amount of an expensive high-performance separating packing is necessary to increase the amount of eluent to be used.

The method (2) requires either installing 2 simulated moving bed chromatographic separators or using the same separator twice. Where 2 simulated moving bed chromatographic separators are installed, the equipment cost is high. Where the same separator is used twice, continuous separation of at least 3 components is impossible to pose a problem of poor productivity.

The method (3) requires an increased number of packing bed units for securing sufficient separation in the case of poorly separable components to entail a rise in equipment cost. Thus, what matters is how to secure a sufficient separation performance with as small a number of packing bed units as possible.

The method (4) lacks a simulated moving bed chromatographic separation operation of withdrawing a weak-affinity component A and a strong-affinity component C while always maintaining a circulating flow though it comprises the step of circulating internal fluid through a packing bed with neither fluid feed to the packing bed nor fluid withdrawal from the packing bed. This makes the circulating flow rate so always constant through the packing bed that the weak-affinity component A moves too fast and is therefore liable to catch up with the strong-affinity component C, thereby posing a problem of poor controllability and giving rise to a difficulty in recovering high-purity components.

The method (5) involves such problems that it is liable to be insufficient in separation performance because the number of packing bed units is as small as four, that it is liable to spread the component B through the whole of the system because withdrawal of the fraction B is limited to partial withdrawal of the corresponding effluent, that it is liable to lower the concentrations of the fractions A and C because they are withdrawn in the whole amounts of effluents from the respective packing bed units, and that there exists some of the packing bed not used for separation.

The method (6) involves such an extreme difficulty in choosing and combining packings that it is hard to carry out on an industrial scale.

As described above, various methods according to a fixed bed procedure, a 2-component separation simulated moving bed procedure, a 3-component separation simulated moving bed procedure or the like are known as the conventional chromatographic separation methods of separating at least 3 components. However, there are problems yet to be solved for improvements such as realization of high-purity and high-recovery separation by improving the efficiency of separation and cost reduction of equipment by simplifying and/or miniaturizing it.

Accordingly, an object of the present invention is to provide a chromatographic separation process for chromatographically separating components from a starting fluid material containing at least 3 components, according to which process a simulated moving bed operation capable of exhibiting a high separation performance can be performed even by using the same number of packing bed units as in the conventional methods to materialize a decrease in the amount of used desorbent such as eluent, high-purity recovery of desired substances, and high recoveries of the desired substances.

Another object of the present invention is to provide a chromatographic separation process according to which a simulated moving bed operation capable of exhibiting a high separation performance is possible, so that simulated moving bed equipment smaller in the number of packing bed units than conventional simulated moving bed equipment for separation of at least 3 components can be used to secure purities and recoveries of components comparable to those by the latter.

DISCLOSURE OF THE INVENTION

As a result of extensive investigations on the foregoing prior art methods, the inventors of the present invention have solved the problems of the conventional chromatographic separation methods to complete the present invention.

Specifically, the present invention provides a chromatographic separation process for chromatographic separation with a chromatographic separator comprising a circulation system of fluid flow path formed by linking in endless series a plurality of packing bed units packed with packing; characterized by comprising, as unit operations in the following Steps (1) and (2), a starting fluid material feed operation of feeding a starting fluid material f containing at least 3 components classed as a weak-affinity component A, a medium-affinity component B and a strong-affinity component C to the circulation system via a designated position; a fluid desorbent feed operation of feeding a fluid desorbent to the circulation system via a designated position; and a fluid fraction withdrawal operation of withdrawing a component A-rich fluid fraction, a component B-rich fluid fraction and a component C-rich fluid fraction, which are separated in the direction of fluid flow by internal fluid flow through the circulation system due to differences thereamong in affinity, out of the circulation system via respective designated fluid withdrawal positions; provided that the fluid feed and withdrawal positions are respectively displaced one by one for respective downstream packing bed units of the circulation system every time after completion of each stage of the Step (1) and the Step (2), which is repeated over a plurality of stages;

Step (1): a step comprising at least the following Operation <1> and the following Operation <2> and/or <3>, and, if necessary, further comprising the following Operation <4>; and Step (2): a step comprising at least the following Operations <2> and <3>, and, if necessary, further comprising the following Operation <4>;

Operation <1>: an operation of shutting off the circulation system of fluid flow path at a designated position, and withdrawing the whole of the component B-rich fluid fraction from an upstream packing bed unit adjacent to the shutoff position or an at least second (preferably second or third) upstream packing bed unit therefrom while feeding the starting fluid material f to a downstream packing bed unit adjacent to the shutoff position and feeding the desorbent D to a packing bed unit on other designated position (these manipulations will hereinafter be respectively referred to as "B withdrawal" "starting solution material feed" in the case where the starting fluid material is a liquid, and "eluent feed" in the case where the desorbent is a liquid);

Operation <2>: an operation of withdrawing part of the component A-rich fraction in the internal fluid circulating through the circulation system from a packing bed unit at a designated position while feeding the desorbent D to a packing bed unit at other designated position (hereinafter referred to as "A withdrawal" like in the foregoing manner);

Operation <3>: an operation of withdrawing part of the component C-rich fraction in the internal fluid circulating through the circulation system either from a packing bed unit at a designated position, to which unit the desorbent D is fed, or from a packing bed unit at other designated position (hereinafter referred to as "C withdrawal" like in the foregoing manner); and Operation <4>: an operation of circulating the internal fluid through the circulation system with neither fluid feed to nor fluid withdrawal from the circulation system (hereinafter referred to as "perfect circulation").

Incidentally, although the following description will be made with priority given to the case of liquids as fluids in order to simplify the explanation, it is a matter of course that the process of the present invention is applicable to objects such as gases or supercritical fluids containing at east 3 components.

In the foregoing process, "withdrawing the whole of" in the manipulation of B withdrawal in Operation <1> refers to withdrawing out of the circulation system the whole liquid (fraction B) flowing into a packing bed unit at a withdrawal position, and hence is distinguished from the manipulation of either A withdrawal or C withdrawal, by which part of the circulating liquid is withdrawn. In Operation <1>, the fraction of the component C is generally withdrawn from a packing bed unit different from a packing bed unit being fed with eluent D, but may be withdrawn from the same packing bed unit as being fed with eluent D in the case of a chromatographic separator small in the number of packing bed units.

According to the present invention, the manipulation of A withdrawal and the manipulation of C withdrawal are each done over an arbitrary time in each step, whereby these fractions can be withdrawn from the circulation system under optimum conditions commensurate with the purpose of separation thereof to improve the degree of freedom of control of the simulated moving bed chromatographic separation procedure.

In the process of the present invention, Step (1) may comprise the foregoing Operations <1> to <4>, and Step (2) may comprise the foregoing Operations <2> to <4>. In this case, performing Operation <4> of perfect circulation can move a given component to a position suited to withdrawal thereof, and can therefore further shorten the operating time of Operation <2> as well as <3>, whereby fractions can be withdrawn properly (at sites where the purities of components are high) even when the number of packing bed units is decreased. In general, the number of stages in the simulated moving bed chromatographic separation procedure is set equal to the number of packing bed units. Accordingly, it is ordinary to increase the number of packing bed units for the purpose of effecting satisfactory separation of components to secure high purities and recoveries of components.

By contrast, in the foregoing case, an operation in each stage of each step is further subdivided, whereby only sufficiently separated narrow part of a fraction can be withdrawn, thereby to gain an advantage of producing substantially the same effect as exerted by increasing the number of packing bed units.

In the process of the present invention, one stage of Step (1) and a plurality of stages of Step (2) combined therewith constitute one cycle of chromatographic separation, which is continuously repeated over a plurality of cycles to industrial advantage, thereby enabling fractions to be continuously and industrially obtained with good productivity. This case is not necessarily limited to a case where the number of packing bed units is the same as the number of stages in one cycle comprising combined Steps (1) and (2). For example, a separator may be run with half a circuit of many installed packing bed units as one cycle.

The number of stages in one cycle comprising one stage of Step (1) and a plurality of stages of Step (2) combined therewith may alternatively be set equal to the number of installed packing bed units constituting the circulation system. In this case, since one cycle wherein one round is made of those many packing bed units is repeated to perform a simulated moving bed chromatographic separation procedure, only one shutoff position will suffice in the circulation system, thereby gaining, e.g., an advantage that installing only one shutoff valve will suffice when it is used.

In the process of the present invention, Step (1) may be taken by performing the foregoing Operations <2>, <1>and <3>either in this order or in the reverse order (i.e., <3>→<1>→<2>), provided that the foregoing Operation <4>of perfect circulation, if necessary, may further be performed before each operation, while Step (2) may be taken by performing Operations <2> and <3> either in this order or in the reverse order (i.e., <3>→<2>), provided that the foregoing Operation <4> of perfect circulation, if necessary, may further be performed before each operation. In this case, where the order of withdrawal is such that A withdrawal is followed by C withdrawal in Steps (1) and (2), the component A concentration profile is broadened toward the top of movement while broadening the component C concentration profile toward the end of movement, whereby the amount of packing bed involved in substantial separation can be increased to be effective in reducing the amount of packing to be used and the amount of eluent to be used. In this case, Operation <4> of perfect circulation may further be performed between every two operations in either Step (1) or (2) [i.e., in the order of <2>→<4>→<1>→<4>→<3> or in the reverse order in Step (1), and in the order of <2>→<4>→<3> or in the reverse order in Step (2)], whereby the foregoing effect can farther be improved Particularly where Operation <4> of perfect circulation is performed between every two operations in either Step (1) or (2), the positions of withdrawing fractions can be more finely adjusted, whereby the fractions can be withdrawn under optimum conditions. In other words, the component A concentration profile is broadened to the foremost top of movement and the component C concentration profile is broadened to the rearmost end of movement by hastening A withdrawal as much as possible and slowing down C withdrawal as much as possible in each step, whereby the amount of packing bed involved in substantial separation can be further increased. In contrast to the foregoing case, where withdrawal of fractions is done in such a way that C withdrawal is followed by A withdrawal, spread of the component A concentration profile in packing bed is held down together with spread of the component C concentration profile not only to gain an advantage that the amount of packing bed for substantially concentrating and recovering the components A and C can be furthermore increased, but also to exert an effect that the amount of eluent to be used can be decreased. In this case as well, Operation <4> of prefect circulation may be performed between every two operations in either Step (1) or (2) as described above, whereby the foregoing effect can be further enhanced. Additionally stated, the effects of the reverse order of C withdrawal→ A withdrawal instead of the order of A withdrawal→C withdrawal are substantially the same in the following cases as well.

In the process of the present invention, Step (1) may also be taken by performing the aforementioned Operations <4>, <1>, <2> and <3> either in this order or in the reverse order as to <2> and <3> (i.e., <4 >→<1>→<3>→<2>), provided that the aforementioned Operation <4> of perfect circulation, if necessary, may further be performed before each operation, while Step (2) may be taken by performing Operations <4>, <2> and <3> either in this order or in the reverse order as to <2> and <3>(i.e., <4>→<3>→<2>), provided that the aforementioned Operation <4> of perfect circulation, if necessary, may further be performed before each operation In this case where both the manipulations of A withdrawal and C withdrawal are performed later in either Step (1) or (2), the component A can advantageously be prevented from catching up with the component C with an increase in the amount of packing bed for concentrating and recovering the component A in connection with the component A, while the amount of packing bed involved in separation of the components B and C can advantageously be increased. In this case, Operation <4> of perfect circulation may be properly performed between operations in either Step (1) or (2) [e.g., in the order of <4>→<1>→<4 >→<2>→<3> or in the order of <4>→<1>→<4>→<3>→<2> in Step (1)], whereby both of A withdrawal and C withdrawal can be done so further later that the amount of packing bed for concentrating and recovering the component A can be increased to further potently prevent the component A from catching up with the component C due otherwise to too fast advancement of the component A through packing bed, while the amount of packing bed involved in separation of the components B and C can be further increased.

In the process of the present invention, Step (1) may also be taken by performing the aforementioned Operations <2>, <3>, <1> and <4> either in this order or in the reverse order as to <2> and <3>(i e., <3>→<2>→<1>→<4>), provided that the aforementioned Operation <4> of perfect circulation, if necessary, may further be performed before each operation, while Step (2) may be taken by performing Operations <2>, <3> and <4> either in this order or in the reverse order as to <2> and <3>(i.e., <3>→<2>→<4>), provided that the aforementioned Operation <4> of perfect circulation, if necessary, may further be performed before each operation. In this case where both of A withdrawal and C withdrawal are done early in either Step (1) or (2), the amount of packing bed involved in separation of the components A and B can be increased, while in connection with the component C, the component C can be prevented from being caught up with by the next component A due otherwise to too slow advancement of the component C through packing bed with an increase in the amount of packing bed for concentrating and recovering the component C. In this case, Step (1) may alternatively be taken by performing Operations <2>, <3>, <4>, <1> and <4> either in this order or in the reverse order as to <2> and <3>(i.e., <3>→<2>→<4>→<1>→<4>) thereby to perform both of A withdrawal and C withdrawal earlier in stages, whereby the amount of packing bed involved in separation of the components A and B can be further increased, while as for the component C, the amount of packing bed for concentrating and recovering the component C can be increased to further potently prevent the component C from being caught up with by the next component A due otherwise to too slow advancement of the component C through packing bed.

The process of the present invention may adopt such a method of preforming Operations <2>and <3>in each one stage that a choice can be made of whether they are done over mutually independent periods of time, over partially overlapping periods of time, or simultaneously in time agreement.

In the foregoing method, the meaning of performing Operations <2>and <3> "over mutually independent periods of time" is intended to encompass a case where Operations <2> and <3> are sequentially performed without any overlapping periods of time and a case where they are performed with Operation <4> of perfect circulation therebetween, provided that the order of Operations <2> and <3>(and <4>) does not matter after all. The meaning of performing Operations <2> and <3> "over partially overlapping periods of time" encompasses a case where Operations <2> and <3> are mutually overlapped in part and a case where one operation is overlapped with the other operation while performing either one of the operations longer than the other operation. The meaning of performing Operations <2> and <3> "simultaneously in time agreement" refers to a case of starting these operations simultaneously and completing these operations simultaneously. The reasons for adopting such a method are as follows: In order to attain excellent separation in simulated moving bed chromatographic separation, it is preferred that the amounts of migration of respective substances through the circulation system be optimized in each step, and it is desired that the foregoing two Operations (<2> and <3>) be completed within given periods of time in order to secure the optimum amounts of migration of the respective substances for A withdrawal and C withdrawal because the concentration profiles, while being separated, move in the downstream direction through the packing bed even during the above-mentioned Operations <2> and <3>. On the other hand, the time of either Operation <2> or Operation <3> is affected and varied by the flow velocities at which the respective fractions of the components (components A and C) can be withdrawn, and by the flow velocity of liquid flowing through the circulation system. These flow velocities are determined by factors such as pumps, flow meters and pipings. Meanwhile, it is desired that inexpensive apparatuses capable of being used in the low flow velocity region be used in an industrial separator. Where inexpensive apparatuses are used, the influences of the fraction withdrawal flow velocities and the flow velocity of liquid flowing through the circulation system on the foregoing operation time are not negligible. When the time is simply prorated for these Operations <2> and <3>, therefore, it is conceivable that the total time thereof may exceed the optimum time to be determined by the foregoing various conditions in one step. In view of this, when each operation time is set according to the above-mentioned method wherein a proper choice can be made from among a case where those operations are performed respectively independently, a case where they are performed simultaneously, and a case where they are performed while partially overlapping them with each other, the degree of freedom of operation control is advantageously enhanced so much that the optimum separation conditions can be satisfied while using inexpensive apparatuses.

Meanwhile, performing Operation <2> or <3> either first or last in each stage of each step can set such conditions that favorable separation can be materialized in accordance with substances to be separated as objects of recovery. In an aspect of securing such conditions as well, these Operations <2> and <3> can be done optionally either simultaneously or while overlapping them with each other first or last in each stage of each step, whereby the purposes of the respective operations suited for separation of substances as objects of recovery can advantageously be satisfied concurrently.

MODES FOR CARRYING OUT THE INVENTION

Modes for carrying out the present invention will now be described while referring to the accompanying drawings, but should not be construed as limiting the scope of the present invention unless they depart from the subject matter thereof.

Embodiment 1

Figure 1:
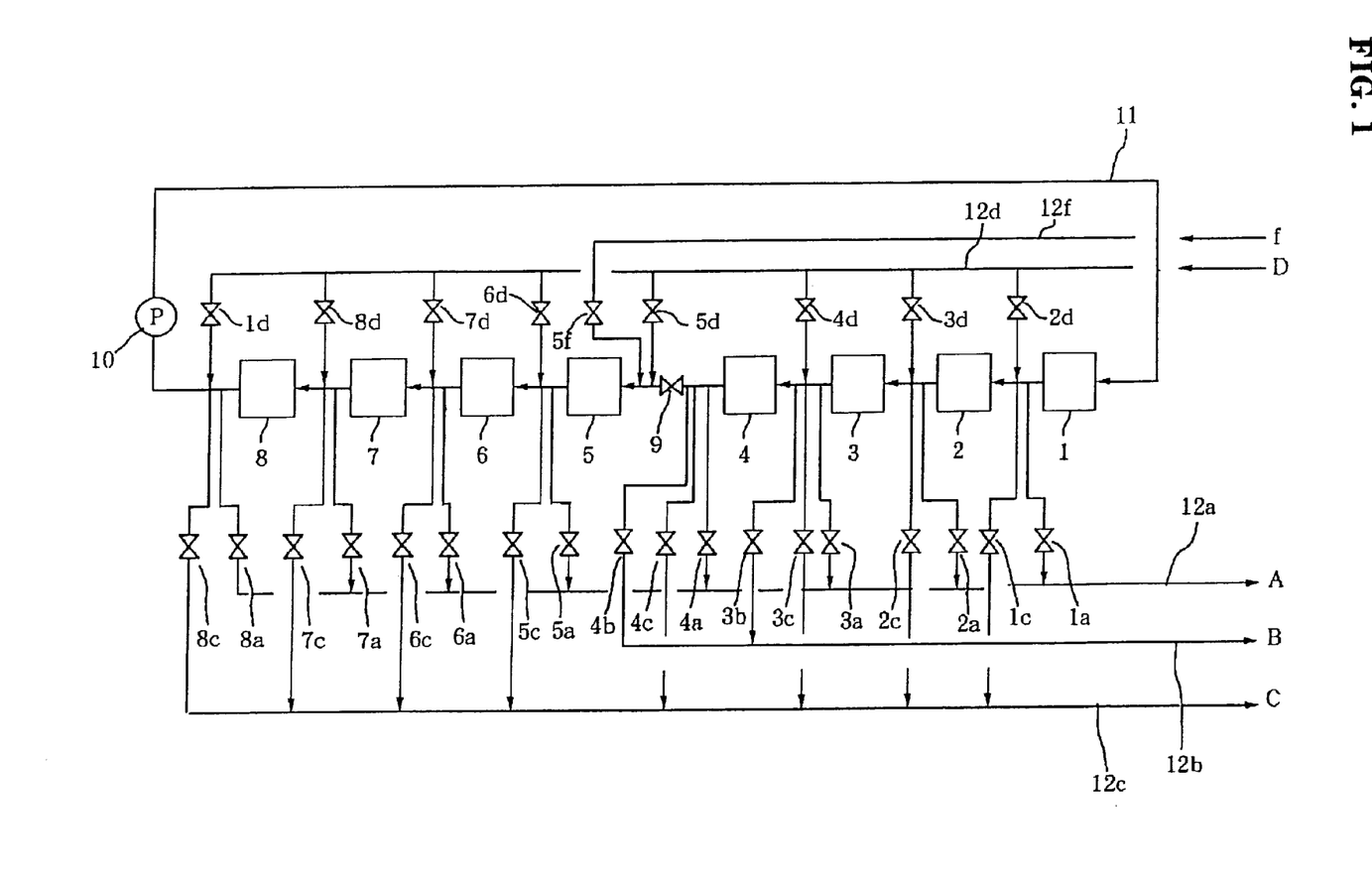
FIG. 1 is a schematic illustration of an example of the constitution of a simulated moving bed chromatographic separator capable of performing the process of the present invention in separation of 3 components according to Embodiment 1.

FIG. 1 is a schematic illustration of an example of the constitution of a simulated moving bed chromatographic separator usable in this Embodiment.

In FIG. 1, numerals 1 to 8 refer to padking bed units, 1$a$ to 8$a$ to fraction A withdrawal valves, 3$b$ and 4$b$ to fraction B withdrawal valves, 1$c$ to 8$c$ to fraction C withdrawal valves, 1$d$ to 8$d$ to eluent feed valves, 5$f$ to a starting solution material feed valve, A to a solution of fraction A as a fraction of component A, B to a solution of fraction B as a fraction of component B, C to a solution of fraction C as a fraction of component C, D to eluent, f to starting solution material, 12a to a fraction A withdrawal piping, 12b to a fraction B withdrawal piping, 12c to a fraction C withdrawal piping, 10 to a circulating pump, 11 to connecting pipings, 12f to a starting solution material feed piping, and 12d to an eluent feed piping.

The ends of the packing bed units 1 to 8 are endlessly linked with the tops of the respective next packing bed units by means of the connecting pipings 11. Branch pipes with the fraction A withdrawal valves 1a to 8a and branch pipes with the fraction C withdrawal valves 1c to 8c are connected to the connecting pipings on the downstream sides of the respective packing bed units, while branch pipes with the fraction B withdrawal valves 3b and 4b are connected to the connecting pipings on the downstream sides of the packing bed units 3 and 4. Branch pipes with the eluent feed valves 1d to 8d, branched from the eluent feed piping 12d, are connected to the connecting pipings on the upstream sides of the respective packing bed units.

The starting solution material feed piping 12f with the starting solution material feed valve 5f is connected to the connecting piping on the upstream side of the packing bed unit 5. The circulating pump 10 is connected to the middle of the connecting piping extended from the end of the packing bed unit 8 to the top of the packing bed unit 1.

The branch pipes with the fraction B withdrawal valves 3b and 4b are connected to the fraction B withdrawal piping 12b, while the branch pipes with the fraction A withdrawal valves 1a to 8a are connected to the fraction A withdrawal piping 12a and the branch pipes with the fraction C withdrawal valves 1c to 8c are connected to the fraction C withdrawal piping 12c. The connecting piping between the packing bed units 4 and 5 is further provided with a shutoff valve 9.

A chromatographic separator is thus constructed for performing the simulated moving bed procedure of this Embodiment. Incidentally, the example of the separator of FIG. 1 is constructed in such a way that a branch pipe with the fraction B withdrawal valve 4b is connected to the connecting piping on the upstream side of the shutoff valve 9 and on the downstream side of the packing bed unit 4 without no packing bed unit therebetween, and to the fraction B withdrawal piping 12b, while a branch pipe with the fraction B withdrawal valve 3b is connected to the connecting piping between the packing bed units 3 and 4 and to the fraction B withdrawal piping 12b. This is aimed at enabling either both valves (valves 4b and 3b) to be used, or one valve to be used without using the other valve, depending upon the operating mode. Incidentally, the number of such fraction B withdrawal valves may also be determined depending upon the number of packing bed units, and may therefore be 3, for example, where the number of packing bed units is 16.

In the separator of FIG. 1, the circulating pump 10, which is installed in the middle of the connecting piping between the packing bed units 8 and 1, is capable of controlling the flow rate to any set values in accordance with a flow rate sequence program with the aid of a controller not shown in the figure while always working continuously. This circulating pump 10 may be installed between any mutually adjacent packing bed units, and whatever number of circulating pumps of this kind may be provided according to the need. Further, the feed valves and the withdrawal valves are each controlled to be opened or closed in accordance with a predetermined valve opening and closing sequence program by means of the controller not shown in the figure, and the shutoff valve 9 installed midway of the connecting piping between the packing bed units 4 and 5 is also controlled to be opened or closed in accordance with a predetermined valve opening and closing sequence program by means of the controller not shown in the figure. Incidentally, although the number of packing bed units is 8 in the separator of FIG. 1, it is not limited thereto in the present invention.

A description will now be made of an example of this Embodiment of chromatographic separation mode for separating a starting solution material containing 3 components (components A, B and C) into 3 fractions enriched with the respective components while using the separator of the constitution of FIG. 1. Incidentally, in this case, the strengths of the affinities of the components for packing are in the following order: component C> component B > component A.

In this Embodiment, Step (1) is taken in Stage 1 and operations in Step (2) are repeated from Stage 2 through Stage 8 to complete one cycle, followed by restart of Step (1) as Stage 1.

In Step (1) as Stage 1 of this Embodiment, operations of A withdrawal (<2>)—perfect circulation (<4>)—starting solution material feed ·eluent feed ·B withdrawal (<1>)—perfect circulation (<4>)—C withdrawal (<3>) are performed in this order.

Specifically, part of effluent from the packing bed unit 6 is first operationally withdrawn as the fraction A via the fraction A withdrawal valve 6a on the downstream side of the packing bed unit 6 while feeding eluent D via the eluent feed valve 1d (A withdrawal in Operation <2>).

Then, eluent D feed is stopped and all of the feed valves and the withdrawal valves are closed. Liquid in all the packing bed units constituting the circulation system is circulated in a predetermined amount by means of the circulating pump 10 (perfect circulation in Operation <4>).

The shutoff valve 9 is then closed, and the fraction B is withdrawn via the fraction B withdrawal valve 4b while feeding the starting solution material f and eluent D via the starting solution material feed valve 5f and the eluent feed valve 1d, respectively (starting solution material f feed ·eluent feed ·B withdrawal in Operation <1>).

Starting solution material feed and eluent feed are then stopped again, and all of the feed valves and the withdrawal valves are closed. Liquid in all the packing bed units constituting the circulation system is circulated in a predetermined amount by means of the circulating pump 10 (perfect circulation in Operation <4>).

Finally, part of effluent from the packing bed unit 2 is withdrawn as the fraction C via the fraction C withdrawal valve 2c on the downstream side of the packing bed unit 2 while feeding eluent D via the eluent feed valve 1d (C withdrawal in Operation <3>).

After completion of this Step (1), the eluent feed position and the solution withdrawal positions are each displaced by one packing bed unit in the downstream direction for shift to Stage 2 for Step (2).

In this Stage 2 wherein the aforementioned operations of Step (2) are performed, operations of A withdrawal (<2>)—perfect circulation (<4>)—C withdrawal (<3>) are performed in this order in this Embodiment.

Specifically, part of effluent from the packing bed unit 7 is first withdrawn as the fraction A via the fraction A withdrawal valve 7a on the downstream side of the packing bed unit 7 while feeding eluent D via the eluent feed valve 2d (A withdrawal in Operation <2>).

Then, eluent D feed is stopped and all of the feed valves and the withdrawal valves are closed. Liquid in all the packing bed units of the circulation system is circulated in a predetermined amount by means of the circulating pump 10 (perfect circulation in Operation <4>).

Finally, part of effluent from the packing bed unit 3 is withdrawn as the fraction C via the fraction C withdrawal valve 3c on the downstream side of the packing bed unit 3 while feeding eluent D via the eluent feed valve 2d (C withdrawal in Operation <3>).

After completion of Stage 2, the eluent feed position and the solution withdrawal positions are each displaced by one packing bed unit in the downstream direction for shift to Stage 3.

In this Stage 3, the same operations of Step (2) as in Stage 2 are performed except that the eluent feed position and the solution withdrawal positions have each been displaced by one packing bed unit in the downstream direction. More specifically, part of effluent from the packing bed unit 8 is first withdrawn as the fraction A via the fraction A withdrawal valve 8a on the downstream side of the packing bed unit 8 while feeding eluent D via the eluent feed valve 3d (A withdrawal in Operation <2>). Then, eluent D feed is stopped and all of the feed valves and the withdrawal valves are closed. Liquid in all the packing bed units is circulated in a predetermined amount by means of the circulating pump 10 (perfect circulation in Operation <4>). Finally, part of effluent from the packing bed unit 4 is withdrawn as the fraction C via the fraction C withdrawal valve 4c on the downstream side of the packing bed unit 4 while feeding eluent D via the eluent feed valve 3d (C withdrawal in Operation <3>).

Thereafter, the eluent feed position and the solution withdrawal positions are each displaced by one packing bed unit in the downstream direction of the circulation system every time after completion of each stage, whereby the operations of Step (2) are repeated until Stage 8. After completion of Stage 8, the eluent feed position and the solution withdrawal positions are each displaced by one packing bed unit in the downstream direction of the circulation system for shift to Stage 1 for Step (1) as the first one of one cycle.

According to this Embodiment of simulated moving bed chromatographic separation with the separator of FIG. 1, A withdrawal is done earliest and C withdrawal is done latest in each stage to spread the component A concentration profile to the foremost top of movement and spread the component C concentration profile to the rearmost end of movement, whereby the amount of packing bed involved in substantial separation can be further increased. Furthermore, inclusion of the circulation Operation <4> can secure the optimum migration rates of the respective substances in all stages, whereby high purities and high recoveries of the components can effectively be secured as compared with conventional methods.

Embodiment 2

Figure 2:
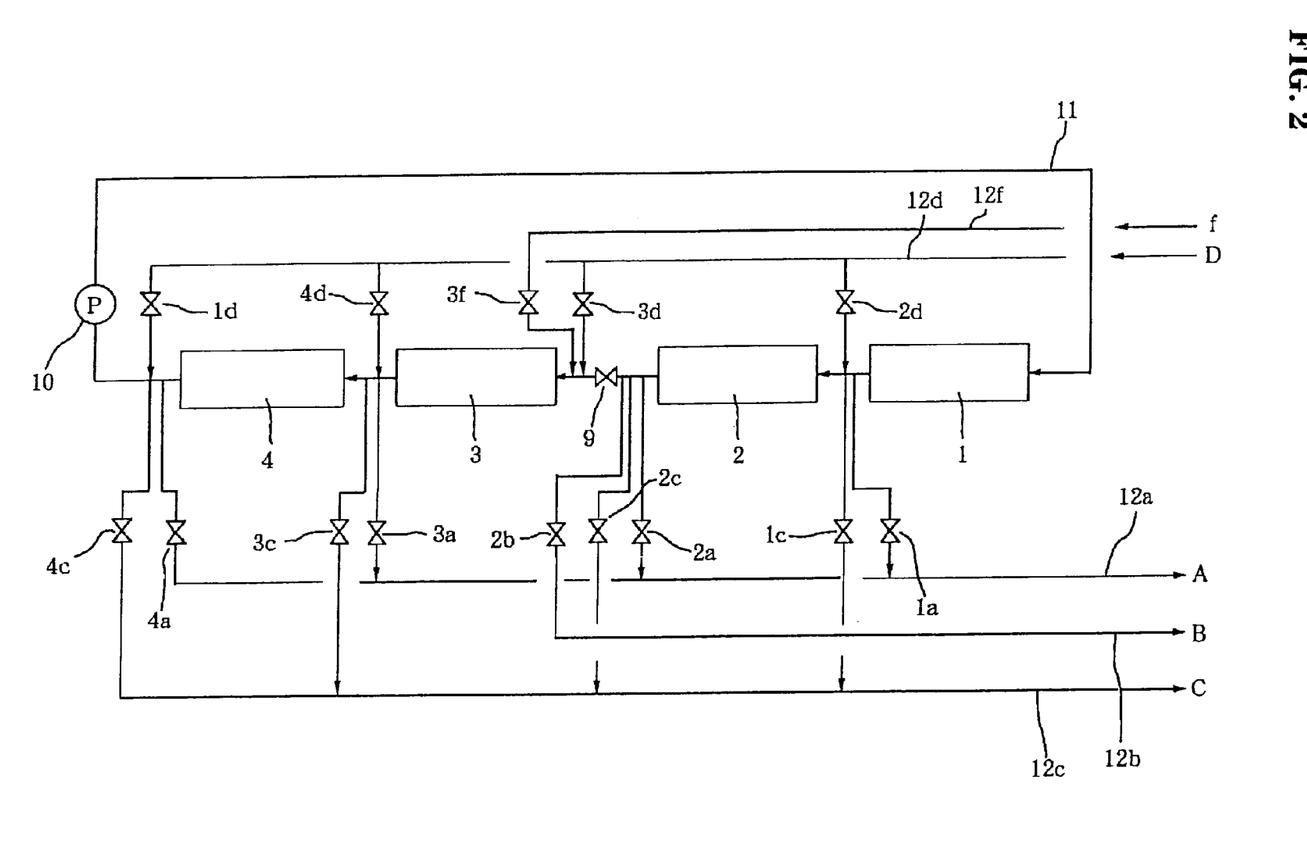
FIG. 2 is a schematic illustration of an example of the constitution of a simulated moving bed chromatographic separator capable of performing the process of the present invention in separation of 3 components according to Embodiment 2.

FIG. 2 is a schematic illustration of an example of the constitution of a simulated moving bed chromatographic separator usable in this Embodiment.

In FIG. 2, numerals 1 to 4 refer to packing bed units, 1a to 4a to fraction A withdrawal valves, 2b to a fraction B withdrawal valve, 1c to 4c to fraction C withdrawal valves, 1d to 4d to eluent feed valves, 3f to a starting solution material feed valve, A to a solution of fraction A as a fraction of component A, B to a solution of fraction B as a fraction of component B, C to a solution of fraction C as a fraction of component C, D to eluent, f to starting solution material, 12a to a fraction A withdrawal piping, 12b to a fraction B withdrawal piping, 12c to a fraction C withdrawal piping, 10 to a circulating pump, 11 to connecting pipings, 12f to a starting solution material feed piping, and 12d to an eluent feed piping.

The constitution of the separator of this example is fundamentally the same constitution of equipment as in Embodiment 1 except that the number of packing bed units 1 to 4 is half that in Embodiment 1. The ends of the packing bed units 1 to 4 are endlessly linked with the tops of the respective next packing bed units by means of the connecting pipings 11. Branch pipes with the fraction A withdrawal valves 1a to 4a and branch pipes with the fraction C withdrawal valves 1c to 4c are connected to the connecting pipings on the downstream sides of the respective packing bed units, while the fraction B withdrawal valve 2b is connected to the connecting piping on the downstream side of the packing bed unit 2. Branch pipes with the eluent feed valves 1d to 4d, branched from the eluent feed piping 12d, are connected to the connecting pipings on the upstream sides of the respective packing bed units. The starting solution material feed piping 12f with the starting solution material feed valve is connected to the connecting piping on the upstream side of the packing bed unit 3.

The circulating pump 10 is further connected to the middle of the connecting piping extended from the end of the packing bed unit 4 to the top of the packing bed unit 1. The fraction B withdrawal piping 12b with the fraction B withdrawal valve 2b is connected to the connecting piping extended from the end of the packing bed unit 2.

The branch pipes with the fraction A withdrawal valves 1a to 4a are connected to the fraction A withdrawal piping 12a and the branch pipes with the fraction C withdrawal valves 1c to 4c are connected to the fraction C withdrawal piping 12c. The connecting piping between the packing bed units 2 and 3 is further provided with a shutoff valve 9.

A simulated moving bed chromatographic separator of this example is thus constructed. Incidentally, the circulating pump 10, which is installed in the middle of the connecting piping between the packing bed units 4 and 1, is capable of controlling the flow rate to any set values in accordance with a flow rate sequence program with the aid of a controller not shown in the figure. Further, the feed valves and the withdrawal valves are each controlled to be opened or closed in accordance with a predetermined valve opening and closing sequence program by means of the controller not shown in the figure, and the shutoff valve 9 installed midway of the connecting piping between the packing bed units 2 and 3 is also controlled to be opened or closed in accordance with a predetermined valve opening and closing sequence program by means of the controller not shown in the figure.

A description will now be made of an example of the simulated moving bed chromatographic separation method of separating a starting solution material containing 3 components (components A, B and C) into 3 fractions enriched with the respective components while using the separator of the constitution of FIG. 2. Incidentally, in this Embodiment, the strengths of affinities of the components for padking are in the following order: component C> component B > component A, which is the same as in the foregoing Embodiment 1.

In this Embodiment, Step (1) is taken in Stage 1 and Step (2) is repeated from Stage 2 through Stage 4 to complete one cycle, followed by restart of Step (1) as Stage 1.

In Step (1) as Stage 1 of this Embodiment, operations of A withdrawal (<2>)—perfect circulation (<4>)—starting solution material feed ·eluent feed ·B withdrawal (<l>)—perfect circulation (<4>)—C withdrawal (<3>) are performed in this order.

Specifically, in Step (1) as Stage 1,part of effluent from the packing bed unit 3 is withdrawn as the fraction A via the fraction A withdrawal valve 3*a* on the downstream side of the packing bed unit 3 while feeding eluent D via the eluent feed valve 1*d* (A withdrawal in Operation <2>).

Then, eluent D feed is stopped and all of the feed valves and the withdrawal valves are closed. Liquid in all the packing bed units of the circulation system is circulated in a predetermined amount by means of the circulating pump 10 (perfect circulation in Operation <4>).

The shutoff valve 9 is then closed, and the fraction B is withdrawn via the fraction B withdrawal valve 2*b* while feeding the starting solution material f and eluent D via the starting solution material feed valve 3*f* and the eluent feed valve id, respectively (starting solution material f feed ·eluent feed ·B withdrawal in Operation <1>).

Then, starting solution material f feed and eluent D feed are stopped again, and all of the feed valves and the withdrawal valves are closed. Liquid in all the packing bed units of the circulation system is circulated in a predetermined amount by means of the circulating pump 10 (perfect circulation in Operation <4>).

Finally, part of effluent from the packing bed unit 1 is withdrawn as the fraction C via the fraction C withdrawal valve 1*c* on the downstream side of the packing bed unit 1 while feeding eluent D via the eluent feed valve 1*d* (C withdrawal in Operation <3>).

After completion of this Step (1), the eluent feed position and the solution withdrawal positions are each displaced by one packing bed unit in the downstream direction for shift to Stage 2 for Step (2).

In this Stage 2 wherein the aforementioned operations of Step (2) are performed, operations of A withdrawal (<2>)—perfect circulation (<4>)—C withdrawal (<3>) are performed in this order in this Embodiment.

Specifically, part of effluent from the packing bed unit 4 is first withdrawn as the fraction A via the fraction A withdrawal valve 4*a* on the downstream side of the packing bed unit 4 while feeding eluent D via the eluent feed valve 2*d* (A withdrawal in Operation <2>).

Then, eluent D feed is stopped and all of the feed valves and the withdrawal valves are closed eluent in all the packing bed units of the circulation system is circulated in a predetermined amount by means of the circulating pump 10 (perfect circulation in Operation <4>).

Finally, part of effluent from the packing bed unit 2 is withdrawn as the fraction C via the fraction C withdrawal valve 2*c* on the downstream side of the packing bed unit 2 while feeding eluent D via the eluent feed valve 2*d* (C withdrawal in Operation <3>).

After completion of Stage 2,the eluent feed position and the solution withdrawal positions are each displaced by one packing bed unit in the downstream direction for shift to Stage 3.

In this Stage 3,the same operations of Step (2) as in Stage 2 are performed except that the eluent feed position and the solution withdrawal positions have each been displaced by one packing bed unit in the downstream direction. More specifically, part of effluent from the packing bed unit 1 is first withdrawn as the fraction A via the fraction A withdrawal valve 1*a* on the downstream side of the packing bed unit 1 while feeding eluent D via the eluent feed valve 3*d* (A withdrawal in Operation <2>). Then, eluent D feed is stopped and all of the feed valves and the withdrawal valves are closed. eluent in all the packing bed units is circulated in a predetermined amount by means of the circulating pump 10 (perfect circulation in Operation <4>). Finally, part of effluent from the packing bed unit 3 is withdrawn as the fraction C via the fraction C withdrawal valve 3*c* on the downstream side of the packing bed unit 3 while feeding eluent D via the eluent feed valve 3*d* (C withdrawal in Operation <3>).

After completion of Stage 3,the eluent feed position and the solution withdrawal positions are each displaced by one packing bed unit in the downstream direction for shift to Stage 4.

In this Stage 4, the same operations of Step (2) as in Stages 2 and 3 are performed except that the eluent feed position and the solution withdrawal positions have each been displaced further by one packing bed unit in the downstream direction. More specifically, part of effluent from the packing bed unit 2 is first withdrawn as the fraction A via the fraction A withdrawal valve 2*a* on the downstream side of the packing bed unit 2 while feeding eluent D via the eluent feed valve 4*d* (A withdrawal in Operation <2>). Then, eluent D feed is stopped and all of the feed valves and the withdrawal valves are closed. Liquid in all the pang bed units is circulated in a predetermined amount by means of the circulating pump 10 (perfect circulation in Operation <4>). Finally, part of effluent from the packing bed unit 4 is withdrawn as the fraction C via the fraction C withdrawal valve 4*c* on the downstream side of the packing bed unit 4 while feeding eluent D via the eluent feed valve 4*d* (C withdrawal in Operation <3>).

After completion of Stage 4, the eluent feed position and the solution withdrawal positions are each displaced by one packing bed unit in the downstream direction of the circulation system in the same manner for shift to Stage 1 for Step (1) as the first one of one cycle.

According to this Embodiment of simulated moving bed chromatographic separation with the separator of FIG. 2, A withdrawal is done earliest and C withdrawal is done latest in each stage to spread the component A concentration profile to the foremost top of movement and spread the component C concentration profile to the rearmost end of movement, whereby the amount of packing bed involved in substantial separation can be further increased. Further, even in such separation of a starting solution material as will require packing bed units (columns) numbering more than four according to conventional methods, the same level of separation performance can be secured using 4 packing bed units numbering less than those in the conventional methods. In other words, the number of packing bed units can be decreased while securing the same level of separation performance, thus producing an effect that a simple separator can be used.

Figure 3:
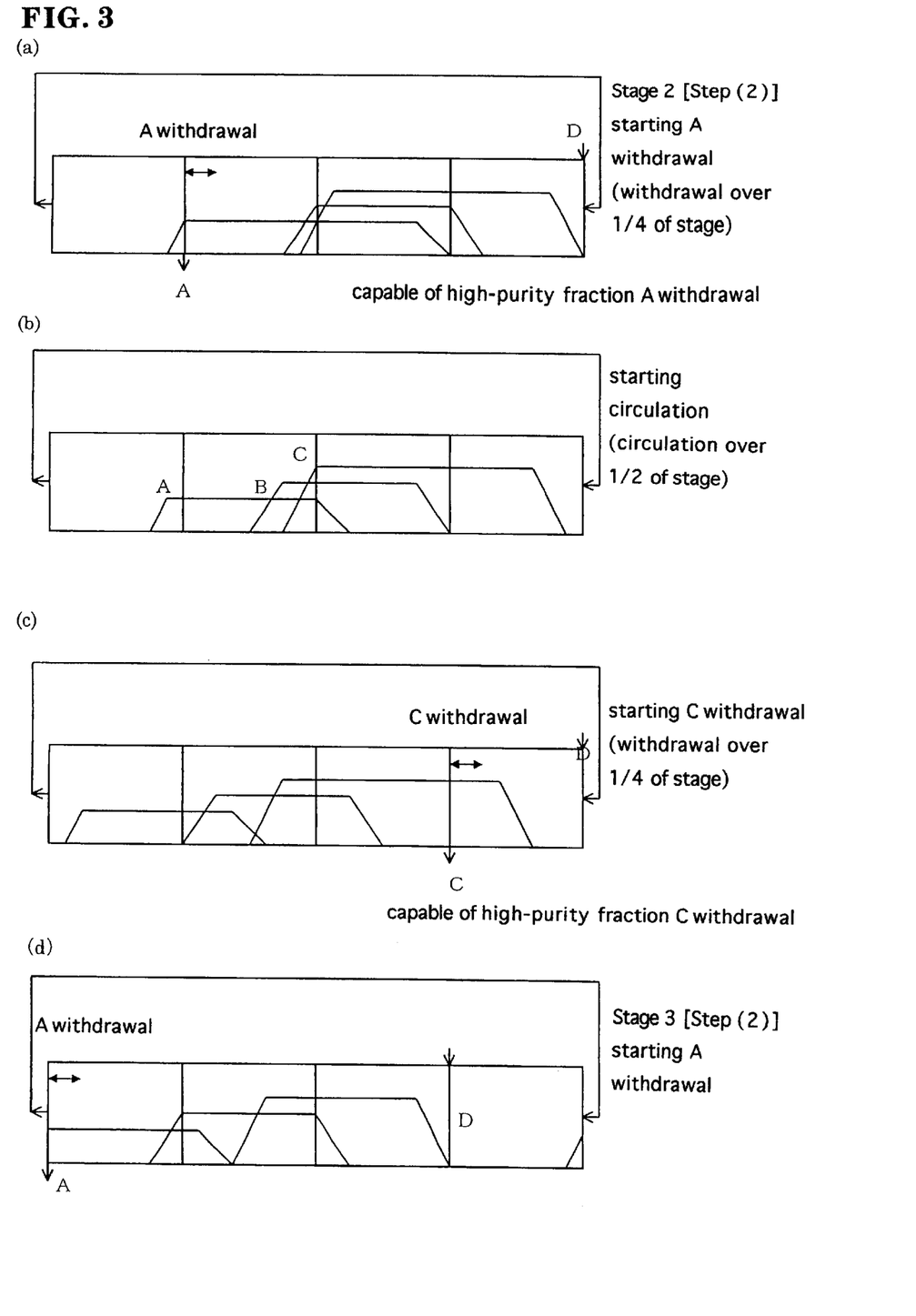
FIGS. 3A, 3B, 3C, and 3D are model diagrams illustrating the concentration profiles of components A, B and C through the circulation system in Step (2), where Operations are performed in the order of <2>→<4>→<3> in an embodiment of the present invention corresponding to Example 1; in which FIG. 3($a$) typically illustrates the concentration profiles of the components at the time of start of A withdrawal in Stage 2, FIG. 3($b$) the concentration profiles of the components at a time of perfect circulation in Stage 2, FIG. 3($c$) the concentration profiles of the components at the time of start of C withdrawal in Stage 2, and FIG. 3($d$) the concentration profiles of the components at the time of start of A withdrawal in Step (2) after shift to Stage 3.

FIG. 3 typically illustrates the concentration profiles of components in Step (2) of an embodiment of the present invention corresponding to Example 1. Some description will be made while referring to this Figure in order to facilitate the understanding of features of the present invention.

FIG. 3(*a*) is a model diagram illustrating the concentration profiles of components at the time of start of A withdrawal in Stage 2. Specifically, A withdrawal is started at a point of time when a peak assigned to the component A fast in moving velocity reaches the position of withdrawal, and A withdrawal is continued until withdrawal of the portion denoted by "A withdrawal" is completed. Thus, only the optimum zone in the component A concentration profile is withdrawn to complete the operation (¼ in breadth of Stage 2 in this FIG.).

FIG. 3(b) is a model diagram illustrating the concentration profiles of the components at a time of perfect circulation in Stage 2. Liquid circulation is continued until the peak portion of the component C slow in moving velocity, which portion is best suited for withdrawal thereof, reaches the position of component C withdrawal (½ in breadth of Stage 2 in this FIG.).

FIG. 3(c) typically illustrates the concentration profiles of the components at the time of start of C withdrawal in Stage 2. When the peak portion of the component C slow in moving velocity, which portion is best suited for withdrawal thereof, reaches the position of component C withdrawal, a fraction of the component C is started to be withdrawn, and C withdrawal is continued until withdrawal of the portion denoted by "C withdrawal" is completed (¼ in breadth of Stage 2 in this Figure).

FIG. 3 (d) is a diagram illustrating the concentration profiles of the components at the time of start of A withdrawal in Step (2) after shift to Stage 3. When C withdrawal as in FIG. 3(c) is completed, a state suited for next A withdrawal is established, so that the same operations as in the foregoing Stage 2 are repeated in Stage 3.

Figure 4:
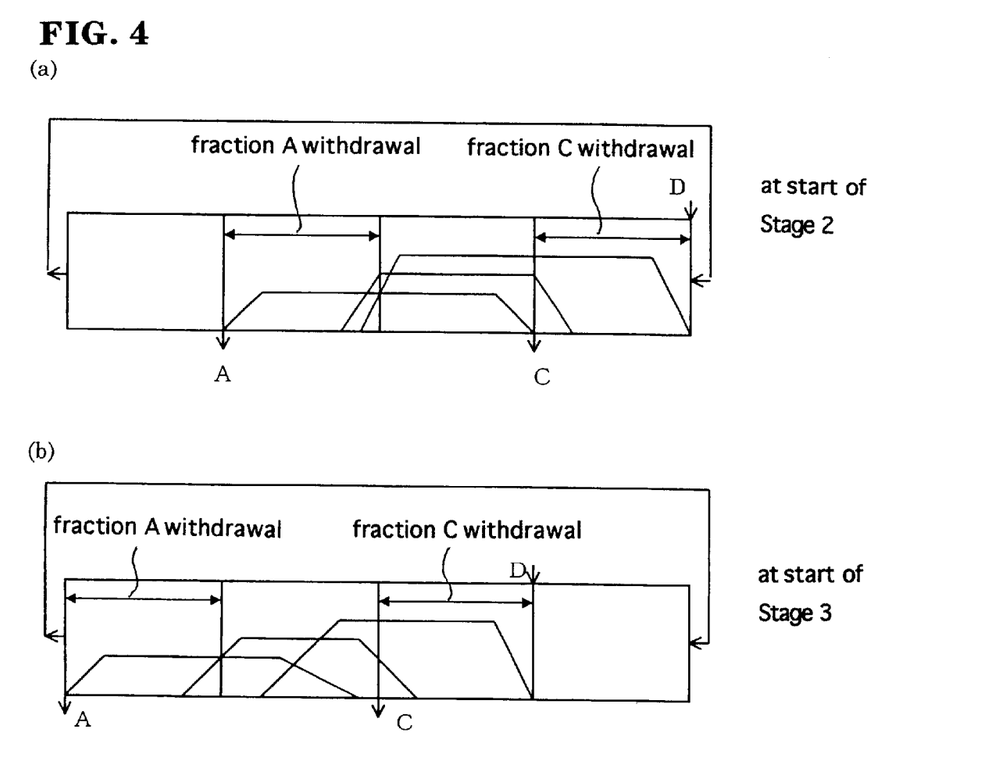
FIGS. 4A and 4B are model diagrams illustrating the concentration profiles of components A, B and C through the circulation system according to a conventional method corresponding to Comparative Example 1; in which FIG. 4($a$) typically illustrates the concentration profiles of the components at the time of start of Stage 2, and FIG. 4($b$) the concentration profiles of the components at the time of start of Stage 3.

FIG. 4 typically illustrates the concentration profiles of components A, B and C through the circulation system in a conventional method corresponding to Comparative Example 1.Some description will be made while referring to FIG. 4. Comparison of this description with the foregoing description in connection with FIG. 3 will further facilitate the understanding of features of the present invention.

The operation of Step (2) in the conventional method corresponding to Comparative Example 1 is an ordinary simulated moving bed operation. Because withdrawal of a fraction of the component A fast in moving velocity and a fraction of the component C slow in moving velocity is continued throughout this step, portions containing impurities mixing therein are also withdrawn as the fractions.

FIG. 4(a) is a model diagram illustrating the concentration profiles of the components at the time of start of Stage 2. Because 2 fractions are withdrawn throughout Step (2), a peak assigned to the component A fast in moving velocity not sufficiently reaches the position of withdrawing the fraction A, and the component B medium in moving velocity still remains at the position of withdrawing the fraction C. Nevertheless, fraction A withdrawal and fraction C withdrawal are started simultaneously. Withdrawal of the fraction of the component A fast in moving velocity and the fraction of the component C slow in moving velocity is continued throughout Stage 2. In the latter half of this stage, the component B and conditionally further the component C catch up with the portion of the fraction A being withdrawn, but must inevitably be withdrawn.

FIG. 4(b) is a model diagram illustrating the concentration profiles of the components at the time of start of Stage 3. Because the top of the component A arrives at the next withdrawal position upon completion of Stage 2, Stage 3 is started. Although the component B remains at the position of withdrawing the fraction C at a point of time of this start, fraction A withdrawal and fraction C withdrawal are started simultaneously.

EXAMPLES

The following Examples will specifically illustrate the present invention, but should not be construed as limiting the scope of the present invention. Incidentally, in the following Examples and Comparative Examples, the solids-based composition is expressed in terms of a real percentage in high-performance eluent chromatography using a sodium-form ion exchange column and a differential refractometer, and "L" denotes liter(s).

Example 1

An aqueous solution (solids content: 59.5 wt. %; solids-based composition: 2.6% oligosaccharides composed of tri- or higher-saccharides, 49.7% maltose, 47.7% glucose) prepared as a starting solution material by mixing equal amounts of refined glucose and refined maltose was separated into 3 components with the 3-component separator of FIG. 2 while using demineralized water as eluent.

Operating conditions were as follows:

AMBERLITE CR-1320 (gel type strongly acidic cation exchange resin in Na form for chromatographic separation) manufactured by Rohm and Haas Company was used as packing. The total amount of packing in the 4 packing bed units was 2,261 ml.

Separation Columns: 20 mm in inside diameter, 1800 mm in bed height, 4 in the number of columns Operating Temperature: 65° C.

One Cycle Time: 40.3 min

Stage 1 [Step (1)]
  Time
    Total Step Time: 11.2 min
    A Withdrawal: 2.9 min
    Perfect Circulation: 1.0 min
    B Withdrawal: 5.4 min
    Perfect Circulation: 0.4 min
    C Withdrawal: 1.5 min
  Flow Velocity
    A Withdrawal: 22.0 ml/min
    Flow Velocity in Packing Bed between A and C Withdrawal Outlets during A Withdrawal and C Withdrawal: 26.0 ml/min
    Flow Velocity during Perfect Circulation: 39.0 ml/min
    Starting Solution Material Feed: 13.0 ml/min
    B Withdrawal: 39.0 ml/min
    C Withdrawal: 26.0 ml/min Stages 2 to 4 [Step (2)]
  Time
    Total Step Time: 9.7 min
    A Withdrawal: 2.9 min
    Perfect Circulation: 3.9 min
    C Withdrawal: 2.9 min
  Flow Velocity
    A Withdrawal: 22.0 ml/min
    Flow Velocity in Packing Bed between A and C Withdrawal Outlets during A Withdrawal and C Withdrawal: 26.0 ml/min
    Flow Velocity during Perfect Circulation: 39.0 ml/min
    C Withdrawal: 26.0 ml/min Eluent/Starting Solution Material Vol. Ratio throughout One Cycle: 9.40

Open valves in each stage were as follows:

Stage 1 A Withdrawal 9, 1d, 3a
  Perfect Circulation 9
  B Withdrawal 3f, 1d, 2b
  Perfect Circulation 9
  C Withdrawal 9, 1d, 1c Stage 2 A Withdrawal 9, 2d, 4a
  Perfect Circulation 9
  C Withdrawal 9, 2d, 2c Stage 3 A Withdrawal 9, 3d, 1a
  Perfect Circulation 9
  C Withdrawal 9, 3d, 3c
Stage 4 A Withdrawal 9, 4d, 2a
  Perfect Circulation 9
  C Withdrawal 9, 4d, 4c As a result of run, there were obtained fractions A, B and C having the respective solids contents and solids-based compositions as shown in the following Table 1:

TABLE 1

|  | Fraction A | Fraction B | Fraction C |
|---|---|---|---|
| Solids Content | 5.7 g/L | 129.2 g/L | 94.3 g/L |
| Tri- or higher-saccharides | 60.1% | 1.7% | 0.2% |
| Maltose | 13.1% | 95.2% | 2.3% |
| Glucose | 26.8% | 3.1% | 97.5% |

Incidentally, the tri- or higher-saccharide oligosaccharides recovery of the fraction A was 63.0%, the maltose recovery of the fraction B was 97.1%, and the glucose recovery of the fraction C was 95.2%.

It is noted from the foregoing results that the component B was scarcely withdrawn in the fractions A and C with a good component B recovery while securing high purities of the components A and C.

Example 2

The same equipment, the same starting solution material and the same packing as used in Example 1 were used to carry out a separation experiment comprising A withdrawal and C withdrawal collectively in the latter half of each stage in each step.

Operating conditions were as follows:
One Cycle Time: 36.8 min
Stage 1 [Step (1)]
  Time
    Total Step Time: 10.7 min
    Perfect Circulation: 2.0 min
    B Withdrawal: 5.4 min
    Perfect Circulation: 0.4 min
    A Withdrawal: 1.4 min
    A·C Withdrawal: 1.5min
  Flow Velocity
    Flow Velocity during Perfect Circulation: 39.0 ml/min
    Starting Solution Material Feed: 13.0 ml/min
    B Withdrawal: 39.0 ml/min
    A Withdrawal: 21.2 ml/min
    Flow Velocity in Packing Bed between A and C Withdrawal Outlets during A Withdrawal and A·C Withdrawal: 26.0 ml/min
    C Withdrawal: 26.0 ml/min
Stages 2 to 4 [Step (2)]
  Time
    Total Step Time: 8.7 min
    Perfect Circulation: 5.8 min
    A·C Withdrawal: 2.9 min
  Flow Velocity
    Flow Velocity during Perfect Circulation: 39.0 ml/min
    A Withdrawal: 21.2 ml/min
    C Withdrawal: 26.0 ml/min
    flow Velocity in Packing Bed between A and C Withdrawal Outlets during A·C Withdrawal: 26.0 ml/min Eluent/Starting Solution Material Vol. Ratio throughout One Cycle: 9.27
Open valves in each stage were as follows:
Stage 1 Perfect Circulation 9
  B Withdrawal 3f, 1b, 2b
  Perfect Circulation 9
  A Withdrawal 9, 1d, 3a
  A·C Withdrawal 9, 1d, 3a, 1c
Stage 2 Perfect Circulation 9
  A·C Withdrawal 9, 2d, 4a, 2c
Stage 3 Perfect Circulation 9
  A·C Withdrawal 9, 3d, 1a, 3c
Stage 4 Perfect Circulation 9
  A·C Withdrawal 9, 4d, 2a, 4c As a result of run, there were obtained fractions A, B and C having the respective solids contents and solids-based compositions as shown in the following Table 2:

TABLE 2

|  | Fraction A | Fraction B | Fraction C |
|---|---|---|---|
| Solids Content | 7.1 g/L | 128.0 g/L | 94.1 g/L |
| Tri- or higher-saccharides | 52.0% | 1.7% | 0.0% |
| Maltose | 25.7% | 95.2% | 2.3% |
| Glucose | 22.3% | 3.1% | 97.7% |

Incidentally, the tri- or higher-saccharide oligosaccharides recovery of the fraction A was 65.6%, the maltose recovery of the fraction B was 96.2%, and the glucose recovery of the fraction C was 95.2%.

Example 3

The same equipment, the same starting solution material and the same packing as used in Example 1 were used to carry out a separation experiment comprising A·C withdrawal in the first half of each stage.

Operating conditions were as follows:
One Cycle Time: 36.8 min
Stage 1 [Step (1)]
  Time
    Total Step Time: 10.7 min
    A Withdrawal: 1.4 min
    A·C Withdrawal: 1.5 min
    Perfect Circulation: 1.0 min
    B Withdrawal: 5.4 min
    Perfect Circulation: 1.4 min
  Flow Velocity
    A Withdrawal: 22.0 ml/min
    Flow Velocity in Packing Bed between A and C Withdrawal Outlets during A Withdrawal and A·C Withdrawal: 26.0 ml/min
    C Withdrawal: 19.6 ml/min
    Starting Solution Material Feed: 13.0 ml/min
    B Withdrawal: 39.0 ml/min
    Flow Velocity during Perfect Circulation: 39.0 ml/min
Stages 2 to 4 [Step (2)]
  Time
    Total Step Time: 8.7 min
    A·C Withdrawal: 2.9 min
    Perfect Circulation: 5.8 min
  Flow Velocity
    A Withdrawal: 22.0 ml/min
    C Withdrawal: 19.6 ml/min
    Flow Velocity in Packing Bed between A and C Withdrawal Outlets during A·C Withdrawal: 26.0 ml/min Flow Velocity during Perfect Circulation: 39.0 ml/min
Eluent/Starting Solution Material Vol. Ratio throughout One Cycle: 9.27
Open valves in each stage were as follows:
Stage 1 A Withdrawal 9, 1d, 3a
   A·C Withdrawal 9, 1d, 3a, 1c
   Perfect Circulation 9
   B Withdrawal 3f, 1d, 2b
   Perfect Circulation 9
Stage 2 A·C Withdrawal 9, 2d, 4a, 2c
   Perfect Circulation 9
Stage 3 A·C Withdrawal 9, 3d, 1a, 3c
   Perfect Circulation 9
Stage 4 A·C Withdrawal 9, 4d, 2a, 4c
   Perfect Circulation 9

As a result of run, there were obtained fractions A, B and C having the respective solids contents and solids-based compositions as shown in the following Table 3:

TABLE 3

|  | Fraction A | Fraction B | Fraction C |
| --- | --- | --- | --- |
| Solids Content | 4.9 g/L | 126.8 g/L | 128.6 g/L |
| Tri- or higher-saccharides | 69.4% | 1.7% | 0.2% |
| Maltose | 15.1% | 95.0% | 4.3% |
| Glucose | 15.5% | 3.2% | 95.6% |

Incidentally, the tri- or higher-saccharide oligosaccharides recovery of the fraction A was 63.0%, the maltose recovery of the fraction B was 95.2%, and the glucose recovery of the fraction C was 95.9%.

Comparative Example 1

The same equipment, the same starting solution material and the same packing as used in Example 1 were used to carry out a separation experiment according to a conventional method (method as disclosed in Japanese Patent Publication No. 24,724/1995).
   Operating conditions were as follows:
   One Cycle Time: 46.8 min
Stage 1 [Step (1) in conventional method]
   Step Time: 5.4 min
   Flow Velocity
      Starting Solution Material Feed: 13.0 ml/min
      Fraction A Withdrawal: 5.6 ml/min
      Fraction B Withdrawal: 39.0 ml/min
Stages 2 to 4 [Step (2) in conventional method]
   Step Time: 13.8 min
   Flow Velocity
      Fraction A Withdrawal: 5.6 ml/min
      Fraction C Withdrawal: 7.0 ml/min
      Flow Velocity in Packing Bed between Fraction A and C Withdrawal Outlets: 26.0 ml/min
Eluent/Starting Solution Material Vol. Ratio throughout One Cycle: 9.85
   Open valves in each stage were as follows:
   Stage 1 3f, 1d, 3a, 2b
   Stage 2 9, 2d, 4a, 2c
   Stage 3 9, 3d, 1a, 3c
   Stage 4 9, 4d, 2a, 4c
As a result of run, there were obtained fractions A, B and C having the respective solids contents and solids-based compositions as shown in the following Table 4:

TABLE 4

|  | Fraction A | Fraction B | Fraction C |
| --- | --- | --- | --- |
| Solids Content | 5.8 g/L | 122.5 g/L | 90.6 g/L |
| Tri- or higher-saccharides | 56.4% | 2.0% | 0.1% |
| Maltose | 39.1% | 93.3% | 7.4% |
| Glucos | 4.5% | 4.7% | 92.5% |

Incidentally, the tri- or higher-saccharide oligosaccharides recovery of the fraction A was 61.3%, the maltose recovery of the fraction B was 90.5%, and the glucose recovery of the fraction C was 95.0%.

As is noted from the foregoing results, considerable amounts of the component B were withdrawn in the fractions A and C with a poor component B recovery according to the method of this Comparative Example 1 in comparison with Examples of the present invention, whereby the purities of the components A and C were lowered. Furthermore, separation of the components A and C in the packing bed was not so good because the number of packing bed units was small.

Comparative Example 2

Equipment with 8 packing bed units as exemplified in FIG. 1 was used together with the same starting solution material and the same packing as used in Example 1 to carry out a separation experiment according to a conventional method (method as disclosed in Japanese Patent Publication No. 24,724/1995).
   Operating conditions were as follows:
   Separation Columns: 20 mm in inside diameter, 900 mm in bed height, 8 in the number of columns
   One Cycle Time: 46.7 min
Stage 1 [Step (1) in conventional method]
   Step Time: 5.4 min
   Flow Velocity
      Starting Solution Material Feed. 13.0 ml/min
      Fraction A Withdrawal: 5.6 ml/min
      Fraction B Withdrawal: 39.0 ml/min
Stages 2 to 4 [Step (2) in conventional method]
   Step Time: 5.9 min
   Flow Velocity
      Fraction A Withdrawal: 5.6 ml/min
      Fraction C Withdrawal: 6.3 ml/min
      Flow Velocity in Packing Bed between Fraction A and C Withdrawal Outlets: 26.0 ml/min
Eluent/Starting Solution Material Vol. Ratio throughout One Cycle: 9.43
   Open valves in each stage were as follows:
   Stage 1 5f, 1d, 6a, 4b
   Stage 2 9, 2d, 7a, 3c
   Stage 3 9, 3d, 8a, 4c
   Stage 4 9, 4d, 1a, 5c
   Stage 5 9, 5d, 2a, 6c
   Stage 6 9, 6d, 3a, 7c
   Stage 7 9, 7d, 4a, 8c
   Stage 8 9, 8d, 5a, 1c
As a result of run, there were obtained fractions A, B and C having the respective solids contents and solids-based compositions as shown in the following Table 5:

TABLE 5

|  | Fraction A | Fraction B | Fraction C |
|---|---|---|---|
| Solids Content | 5.9 g/L | 128.3 g/L | 96.1 g/L |
| Tri- or higher-saccharides | 61.7% | 1.5% | 0.1% |
| Maltose | 13.3% | 95.4% | 2.5% |
| Glucose | 25.0% | 3.1% | 97.4% |

Incidentally, the tri- or higher-saccharide oligosaccharides recovery of the fraction A was 61.7%, the maltose recovery of the fraction B was 96.9%, and the glucose recovery of the fraction C was 95.2%.

Comparison of Example 1, wherein the process of the present invention was carried out, with Comparative Example 1 is as follows: In Example 1, although the starting solution material feed rate per unit time was high due to the short one cycle time and the amount of used eluent based on the starting solution material was smaller by 4.6% than that in Comparative Example 1, there could be attained such great improvements in separation performance that the fractions could be separated with respective purities of the principal components higher by 1.9 to 5.0% than those in Comparative Example 1, and that the fraction B could be separated with a maltose recovery higher by 6.6% than that in Comparative Example 1. In other words, the process of the present invention is superior to the conventional method with the same number of divisions of the packing bed (number of packing bed units).

In comparison of Example 1 with Comparative Example 2, the respective principal component purities and recoveries of the fractions, substantially comparable to those in Comparative Example 2, could be secured in Example 1 though the starting solution material feed rate per unit time was high due to the short one cycle time. In other words, according to the present invention, the number of divisions of the packing bed (number of packing bed units) in the chromatographic separator could be halved without detriment to separation performance, as compared with that in the conventional method.

Comparison of Example 2 with Example 1 is as follows: In Example 2, oligosaccharides composed of tri- or higher-saccharides as the component A could be prevented from catching up with the fraction C with a tri- or higher-saccharide oligosaccharides content of the fraction C of less than 0.1%, while maintaining the respective principal component purities of the fractions B and C at levels of those in Example 1 though the starting solution material feed rate per unit time was higher than that in Example 1 due to the shorter one cycle time than that in Example 1 and the amount of used eluent based on the starting solution material was smaller by 1.4% than that in Example 1.

Comparison of Example 3 with Example 1 is as follows: In Example 3, the amount of glucose as the component C getting into the fraction A due to slowdown thereof could be greatly decreased with an increase in the tri- or higher-saccharide oligosaccharides purity of the fraction A, while maintaining the principal component purity of the fraction B at a level of that in Example 1 though the starting solution material feed rate per unit time was higher than that in Example 1 due to the shorter one cycle time than that in Example 1 and the amount of used eluent based on the starting solution material was smaller by 10.9% than that in Example 1.

INDUSTRIAL APPLICABILITY

According to the present invention for chromatographic separation of a starting solution material containing at least 3 components into at least 3 fractions, the separation performance can be improved over those in conventional methods while using 3-component separation simulated moving bed equipment having the same number of packing bed units. In other words, according to the present invention, there is obtained an advantage that desired substances can be recovered in high purities and at high recoveries while decreasing the amount of eluent water to be used.

According to the present invention, there also is obtained an advantage that the number of packing bed units necessary for securing a separation performance comparable to those in conventional methods of running a simulated moving bed chromatographic separator can be decreased.

The process of the present invention, which is typically applicable as a method of separating at least 3 components contained in a eluent, is an industrial process for treatment of a large amount of a eluent in particular. The usefulness of the process of the present invention is very great particularly in industrial sugar refining facilities for separating and refining various mixtures of saccharides or sugar alcohols while using as packing a strongly acidic cation exchange resin in an alkali metal form or in an alkaline earth metal form. Specific examples of such sugar refining include separation of sucrose and other useful substances from molasses, separation of glucose, fructose and oligosaccharides from isomerized sugar, separation of components from a eluent mixture containing lactose, lactulose and galactose, separation of components from a eluent mixture containing glucose, sucrose and fructo-oligosaccharides, separation of components from a liquid mixture containing glucose, isomaltose and isomaltodextrin, separation of components from a eluent mixture containing glucose, maltose and maltodextrin, and separation of components from a eluent mixture containing sugar alcohols such as sorbitol and maltitol.

What is claimed is:

1. A chromatographic separation process for chromatographic separation with a chromatographic separator comprising a circulation system of fluid flow path formed by linking in endless series a plurality of packing bed units packed with packing; characterized by comprising, as unit operations in the following Steps (1) and (2), a starting fluid material feed operation of feeding a starting fluid material f containing at least 3 components classed as a component A having a weak affinity for packing, a component B having a medium affinity for packing and a component C having a strong affinity for packing to the circulation system via a designated position; a fluid desorbent feed operation of feeding a fluid desorbent to the circulation system via a designated position; and a fluid fraction withdrawal operation of withdrawing a component A-rich fluid fraction, a component B-rich fluid fraction and a component C-rich fluid fraction, which are separated in the direction of fluid flow by internal fluid flow through the circulation system due to differences thereamong in affinity, out of the circulation system via respective designated fluid withdrawal positions; provided that the fluid feed and withdrawal positions are respectively displaced one by one for respective downstream packing bed units of the circulation system every time after completion of each stage of Step (1) and Step (2), which is repeated over a plurality of stages;

Step (1): a step comprising at least the following Operation <1> and the following Operation <2> and/or <3>, and optionally further comprising the following Operation <4>; and Step (2): a step comprising at least the following Operations <2> and <3>, and optionally further comprising the following Operation <4>;

Operation <1>: an operation of shutting off the circulation system of fluid flow path at a designated position, and withdrawing the whole of the component B-rich fluid fraction from an upstream packing bed unit adjacent to the shutoff position or an at least second upstream packing bed unit therefrom while feeding the starting fluid material f to a downstream packing bed unit adjacent to the shutoff position and feeding the desorbent D to a packing bed unit on other designated position;

Operation <2>: an operation of withdrawing part of the component A-rich fraction in the internal fluid circulating through the circulation system from a packing bed unit at a designated position while feeding the desorbent D to a packing bed unit at other designated position;

Operation <3>: an operation of withdrawing part of the component C-rich fraction in the internal fluid circulating through the circulation system either from a packing bed unit at a designated position, to which unit the desorbent D is fed, or from a packing bed unit at other designated position; and Operation <4>: an operation of circulating the internal fluid through the circulation system with neither fluid feed to nor fluid withdrawal from the circulation system.

2. A chromatographic separation process as claimed in claim 1; characterized in that Step (1) comprises Operations <1> to <4>, while Step (2) comprises Operations <2> to <4>.

3. A chromatographic separation process as claimed in claim 1; characterized in that one stage of Step (1) and a plurality of stages of Step (2) combined therewith constitute one cycle of chromatographic separation, which is continuously repeated over a plurality of cycles.

4. A chromatographic separation process as claimed in claim 3; characterized in that the number of stages in one cycle comprising one stage of Step (1) and a plurality of stages of Step (2) combined therewith is equal to the number of installed packing bed units constituting the circulation system.

5. A chromatographic separation process as claimed in claim 1; characterized in that Step (1) is taken by performing Operations <2>, <1> and <3> either in this order or in the reverse order, and optionally further performing Operation <4> before each operation, while Step (2) is taken by performing Operations <2> and <3> either in this order or in the reverse order, and optionally further performing Operation <4> before each operation.

6. A chromatographic separation process as claimed in claim 5; characterized in that Step (1) is taken by performing Operations <2>, <4>, <1>, <4> and <3> either in this order or in the reverse order, while Step (2) is taken by performing Operations <2>, <4> and <3> either in this order or in the reverse order.

7. A chromatographic separation process as claimed in claim 1; characterized in that Step (1) is taken by performing Operations <4>, <1>, <2> and <3> either in this order or in the reverse order as to <2> and <3>, and optionally further performing Operation <4> before each operation, while Step (2) is taken by performing Operations <4>, <2> and <3> either in this order or in the reverse order as to <2> and <3>, and optionally further performing Operation <4> before each operation.

8. A chromatographic separation process as claimed in claim 7; characterized in that Step (1) is taken by performing Operations <4>, <1>, <4>, <2> and <3> either in this order or in the reverse order as to <2> and <3>.

9. A chromatographic separation process as claimed in claim 1; characterized in that Step (1) is taken by performing Operations <2>, <3>, <1> and <4> either in this order or in the reverse order as to <2> and <3>, and optionally further performing Operation <4> before each operation, while Step (2) is taken by performing Operations <2>, <3> and <4> either in this order or in the reverse order as to <2> and <3>, and optionally further performing Operation <4> before each operation.

10. A chromatographic separation process as claimed in claim 9; characterized in that Step (1) is taken by performing Operations <2>, <3>, <4>, <1> and <4> either in this order or in the reverse order as to <2> and <3>.

11. A chromatographic separation process as claimed in claim 1; characterized in that it adopts such a method of performing Operations <2> and <3> in each one stage that a choice can be made of whether they are done over mutually independent periods of time, over partially overlapping periods of time, or simultaneously in time agreement.

* * * * *

UNITED STATES PATENT AND TRADEMARK OFFICE
CERTIFICATE OF CORRECTION

PATENT NO. : 6,328,895 B1  Page 1 of 1
DATED : December 11, 2001
INVENTOR(S) : Takayuki Masuda et al.

It is certified that error appears in the above-identified patent and that said Letters Patent is hereby corrected as shown below:

Column 1,
Line 36, after "component" insert -- C --
Line 62, change "10 158, 105/1988" to -- 158, 105/1988 --

Column 8,
Line 60, change "padking" to -- packing --

Column 13,
Line 18, change "id" to -- ld --
Line 47, change "closed eluent" to -- closed. Liquid --

Column 14,
Line 3, change "eluent" to -- Liquid --
Line 26, change "pang" to -- packing --

Column 16,
Line 1, change "a real" to -- areal --

Column 17,
Line 66, change "flow" to -- Flow --

Column 18,
Line 5, change "lb" to -- ld --

Signed and Sealed this

Ninth Day of September, 2003

JAMES E. ROGAN
*Director of the United States Patent and Trademark Office*